United States Patent Office 2,866,479
Patented Dec. 30, 1958

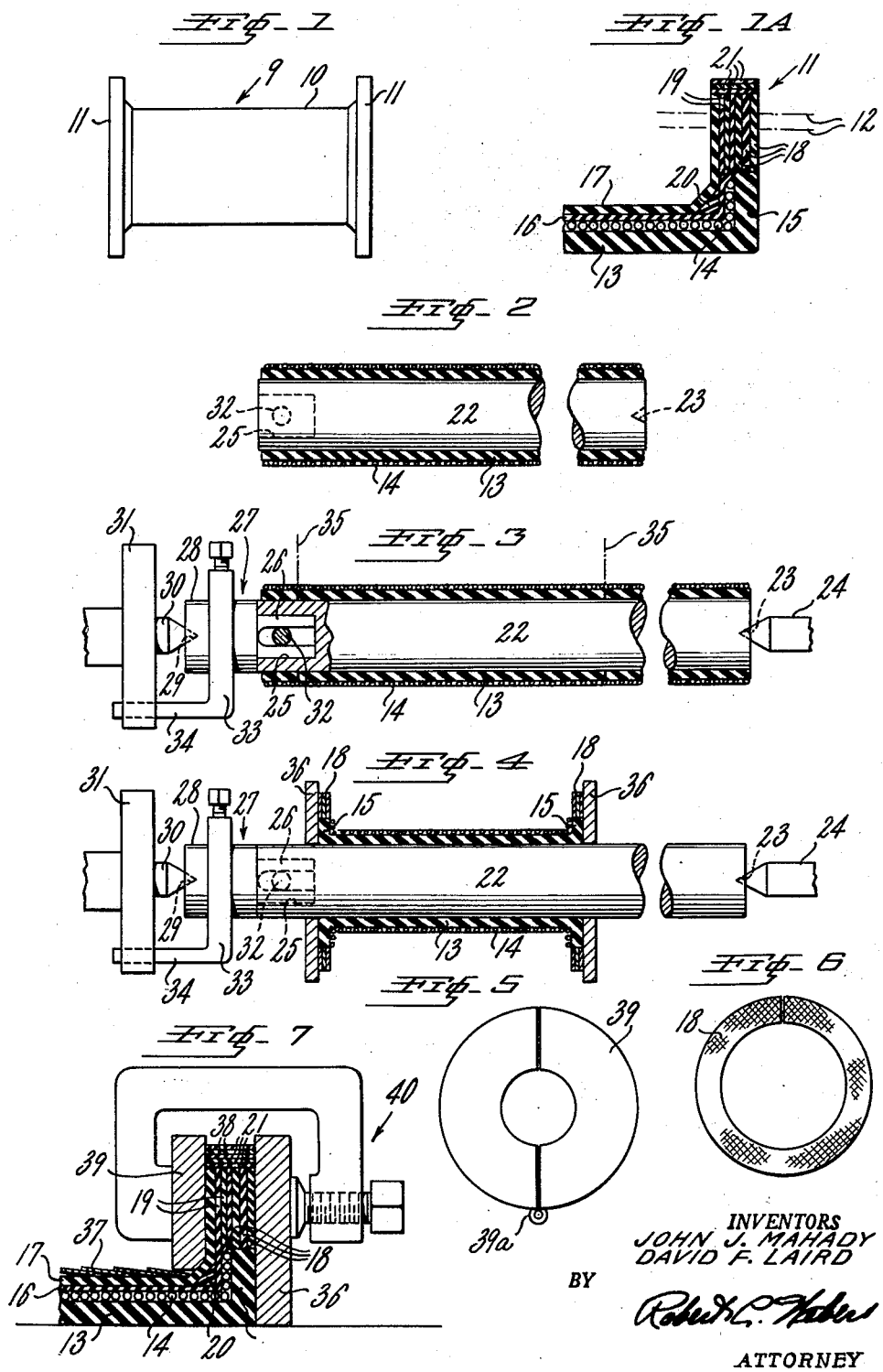

2,866,479

MANUFACTURE OF FLANGED PINCH VALVE HOSE

John J. Mahady, Hackensack, and David F. Laird, Passaic, N. J., assignors to United States Rubber Company, New York, N. Y., a corporation of New Jersey Application February 25, 1955, Serial No. 490,489

7 Claims. (Cl. 138—55)

This invention relates to the manufacture of an improved flange pinch valve hose.

In the prior art, the type of hose with which this invention is concerned is ordinarily made by wrapping; however, the present invention departs from such a procedure in mechanically applying reinforcement by braiding and thus has the following advantages. First, the use of a braided construction permits several valve bodies to be braided in one pass of the braider, thereby producing a decided improvement in uniformity of build-up and effecting a substantial savings in labor, material and time over conventional methods of fabric build-up by hand. Furthermore, the use of braid produces a more flexible valve with a corresponding increase in service life and permits a wider range of reinforcing materials for a higher strength in special applications.

An object of the invention therefore, is to provide high strength and flexibility in a flanged pinch valve hose having braided reinforcement.

Another object of the invention is to manufacture a flanged pinch valve hose having a tube with rims formed thereon in an effective and efficient manner.

A further object is to manufacture a flanged pinch valve hose by extending the rims thereon in a novel manner to form the flanges.

Another object of the invention is to manufacture a flanged pinch valve hose comprising a uniformly built-up assembly.

A further object is to manufacture a flanged pinch valve hose sealed against undesirable wear and fluid infiltration.

The above and other objects and advantages of the invention will become fully apparent from the following specification when read in connection with the accompaning drawing and will be pointed out with particularity in the appended claims.

In the drawings:

Fig. 1 is a longitudinal view of the flanged pinch valve hose of the invention;

Fig. 1A is an enlarged sectional view illustrating part of the central hose section and one of the flanges shown in Fig. 1;

Fig. 2 is a longitudinal elevational view partly in section, illustrating the braided tube mounted on the mandrel;

Fig. 3 is a longitudinal elevational view partly in section illustrating the tube and mandrel of Fig. 2 placed in a lathe;

Fig. 4 is a view similar to Fig. 3 illustrating the application of the collars in bending the ends of the tube outwardly to form rims and the application of the fabric rings in extending the rims to form flanges;

Fig. 5 is an end elevational view of the split collar used for clamping the flange;

Fig. 6 is an end elevational view of one of the fabric rings shown in Fig. 4; and Fig. 7 is a view similar to Fig. 1A but also shows the wrapping of the hose assembly, and a clamp securing the flange prior to the curing step.

Referring now to Fig. 1, the pinch valve hose 9 comprises a uniformly built-up assembly having a central hose section 10 provided with end flanges 11 of the construction shown in Fig. 1A. The flanges 11 are adapted to be bored through as indicated by the dot-and-dash lines 12, and bolts (not shown) are passed through the holes thus formed to clamp said flanges to the flanges of the pipes (not shown) which are connected by hose 9. The hose section 10 between the flanges 11 is pinched together to regulate the flow of fluid between the pipes.

Referring to Fig. 1A, the hose 9 comprises an assembly of the following components. The first is an inner rubber lining 13; this lining is reinforced by braiding one or more layers 14 of flexible cotton strands over it, and the ends of lining 13 and braid 14 are turned up to form rim 15. A thin rubber layer 16 is applied over the braid, and this layer is in turn covered by a thick outer rubber jacket 17. A triangular rubber ring or bead 20 is located at the base of rim 15 and between the layers 16 and 17 in order to fill up the space formed there, because the thicker layer 17 cannot take as severe a bend as the thinner layer 16. Three fabric rings 18, preferably made of canvas, are placed over the outer periphery of the rim 15 and aligned with the end of lining 13. The layers 16 and 17 are extended to the height of the outer peripheries of the fabric rings 18, and the layer 17 forms a seal for the central hose section 10 and the inside of the flange 11. Additional rubber filler rings 19 are inserted between the fabric rings 18 and the end of the layer 17 to provide a filler equal to the thickness of the braided layer 14 which is missing from that section. The fabric rings 18 are provided to secure the bolts which are passed through the openings 12 therein. The peripheries of the layers 16, 17 and rings 18, 19 are covered and sealed by additional rubber layers 21.

It will now be apparent that rings 18, 19 and layer 16 extend the rim both radially and axially to form the flange 11. The outside of said flange is sealed in two ways, first by the firm engagement between the rim 15, fabric rings 18 and layers 21 after the assembly has been cured, and second by the firm abutment with the pipe flanges to which the flange 11 is bolted in actual use. The purpose of such complete sealing is to prevent undesirable wear of and fluid infiltration into said hose.

The manufacture of the pinch valve hose 9 is illustrated in Figs. 2 through 7. Referring to Fig. 2, the first step in forming the hose assembly comprises mounting the curable rubber lining tube 13 over a mandrel 22 in a manner well known in the art. The tube is expanded by means of air pressure and blown onto the mandrel, then the pressure is released, permitting the tube to contract and grip the mandrel firmly. At least one layer of braid 14 is then mechanically applied over said tube, which has been coated with suitable cement, by passing the tube and mandrel through a braider (not shown) in the usual manner. The braid 14 provides a flexible but strong reinforcement for increased service life of the hose.

As seen in Figs. 2 and 3, the mandrel 22 is provided with a recess 23, which is adapted to receive the tail stock center pin 24 of a lathe, and the opposite end of the mandrel 22 is provided with a cylindrical bore 25 which is adapted to receive the split end 26 of an end piece 27 having a head 28 provided with a recess 29 to receive the center pin 30 of the revolving head 31 of the lathe. The split end 26 of the end piece 27 fits over a pin 32 in the mandrel 22 to prevent said end piece from rotating in the bore 25. The mandrel 22 is then placed in a lathe between the center pins 24 and 30 thereof. A dog 33 is clamped to the end piece 27, and its tail 34 extends into a notch in the revolving head 31 of the lathe to cause the mandrel 22 to rotate. The mandrel is preferably long enough to have a number of pinch valve hoses made thereon, but for simplicity only one pinch valve hose is shown. The reinforced tube 13 is now cut to the lengths required for the number of pinch valve hoses desired. This is done by placing a knife at the positions indicated by the dot-and-dash lines 35 while the mandrel 22 is being rotated so as to cut the tube at those positions.

After the cuts are made, the mandrel 22 is removed from the lathe and the cut tubes 13 are taken off the mandrel. Upon reference to Fig. 4, it will be seen that mandrel 22 (or another mandrel, if desired) is provided with collars 36 slidably mounted thereon, and each tube 13 is relocated on the mandrel between a pair of these collars. The mandrel 22 is replaced in the lathe and the ends of the tube 13 and braided layer 14 are bent outwardly to form the rims 15 by pushing the collars 36 against the ends and towards the middle of the tube 13. It is evident that the foregoing steps constitute an effective and efficient way of forming said rims.

Referring now to Figs. 4 and 7, the split canvas rings 18 (illustrated in elevation in Fig. 6) are placed around the outer periphery of the rim 15, thereby extending said rim radially. A thin sheet of curable rubber 16 is then applied over the braided layer 14, positioned adjacent the fabric rings 18 and extended up to the height of their outer peripheries by folding or wrapping. The layer 16 also extends the rim both radially and axially. Split, curable rubber filler rings 19 (similar to fabric rings 18) are positioned adjacent the rubber layer 16 and rings 18 to further extend the rim 15 both radially and axially, thereby completing the formation of flange 11. Then, the split, triangular ring 20 of curable rubber is placed at the base of the rim 15 and over the layer 16. The outer jacket layer 17 is applied by folding or wrapping curable sheet rubber around the layer 16 and ring 20; layer 17 is also carried up to the height of the peripheries of the fabric rings 18. The periphery of the flange is then wrapped with curable rubber layers 21 to complete the covering thereof. Each of the foregoing components are secured to each other by a suitable cement. It is thus apparent that the foregoing steps comprise a novel procedure for extending the rim 15 to form the flange 11 and for covering the same.

Referring again to Fig. 7, the outer layer 17 of rubber is wrapped spirally with tape 37 and the outer periphery of the flange 11 is wrapped with tape 38. A split metal ring 39, preferably hinged at 39a as shown in Fig. 5, is applied to the inside of the flange 11; then the inner ring 39 and collar 36 are secured together by means of a clamp 40. The clamp 40 and tapes 37, 38 place the hose assembly under compression to insure an integral, sealed structure upon vulcanization.

The mandrel 22 with the hose assembly thereon is then taken from the lathe and placed in the vulcanizer, where the foregoing rubber components of the assembly are cured. The clamps 40 are released, the tapes 37 and 38 are unwrapped, and the completed flanged hose is removed from the mandrel. It is apparent that the above noted cementing, rubber and tape wrapping, clamping and curing steps provide a flanged hose which is formed into an integral, bonded structure and adequately sealed against undesirable wear and fluid infiltration. It is further apparent that the tube and the various rubber layers and rings may be made of natural or synthetic rubber, that the cotton braid may be replaced by other braidable fabrics such as nylon, rayon and the like, and that the split canvas rings may also be manufactured of other suitable fabrics.

While the invention herein illustrated has been described by reference to specific forms thereof, it is to be understood that various modifications may be made therein by those skilled in the art without departing from the spirit of the invention as defined in the appended claims.

Having thus described our invention, what we claim and desire to protect by Letters Patent is:

1. The method of making a flexible, flanged pinch valve hose which comprises forming an assembly by mounting a curable rubber tube over a mandrel, braiding at least one layer of fabric reinforcement over said tube, bending at least one end of said tube outwardly to form a rim thereon, extending said rim radially and axially to form a flange, covering said tube and flange with curable rubber, and curing the rubber in said assembly to form an integral, bonded structure.

2. The method of making a flexible, flanged pinch valve hose which comprises forming an assembly by mounting curable rubber tube over a mandrel, braiding at least one layer of fabric reinforcement over said tube substantially throughout the length thereof, bending at least one end of said tube outwardly to form a rim thereon by pushing against said tube with a collar, extending said rim radially and axially by adding rings thereto to form a flange, covering said tube and flange with curable rubber, and curing the rubber in said assembly to form an integral, bonded structure.

3. The method of making a flexible, flanged pinch valve hose which comprises forming an assembly by mounting a curable rubber tube over a mandrel, braiding at least one layer of fabric reinforcement over said tube, bending at least one end of said tube radially outwardly to form an external rim thereon by pushing a collar against said end, extending said rim radially outwardly and axially by positioning fabric rings and curable rubber filler rings around said rim to form a flange, covering said tube and flange with curable rubber, and curing the rubber in said assembly to form an integral, bonded structure.

4. The method of making a flexible, flanged pinch valve hose which comprises forming an assembly by mounting a curable rubber tube over a mandrel, braiding at least one layer of fabric reinforcement over said tube substantially throughout the length thereof, cutting said tube to length, bending the ends of said tube radially outwardly to form external rims thereon by pushing collars slidably mounted on said mandrel against said ends, extending said rims radially outwardly and axially by positioning fabric rings around said rim and adjacent said collars, by positioning a curable rubber layer over said tube and adjacent said fabric rings and by positioning curable rubber filler rings around said rims adjacent said layer to form flanges, covering said tube and layer with an outer, curable rubber jacket to form flanges, covering the peripheries of said flanges with additional, curable rubber layers, and vulcanizing the rubber in said assembly to form an integral, bonded structure.

5. A flexible, flanged pinch valve hose comprising an assembly of a curable rubber tube, at least one layer of fabric reinforcement braided over said tube substantially throughout the length thereof, said tube having at least one end bent outwardly to form a rim thereon, said rim being extended radially and axially by means of rings added thereto to form a flange, and a covering of curable rubber over said tube and flange, the rubber in said assembly being cured to form an integral, bonded structure.

6. A flexible, flanged pinch valve hose comprising an assembly of a curable rubber tube, at least one layer of fabric reinforcement braided over said tube, said tube having at least one end bent radially outwardly to form an external rim thereon, said rim being extended radially outwardly and axially by means of fabric rings and curable rubber filler rings positioned around said rim to form a flange, and a covering of curable rubber over said tube and flange, the rubber in said assembly being cured to form an integral, bonded structure.

7. A flexible, flanged pinch valve hose comprising an assembly of a curable rubber tube, at least one layer of fabric reinforcement braided over said tube substantially throughout the length thereof, said tube having each end bent radially outwardly to form external rims thereon, said rims being extended radially outwardly and axially by means of fabric rings positioned around said rims, a curable rubber layer positioned over said tube and adjacent said fabric rings, and curable rubber filler rings positioned around said rims adjacent said layer to form flanges, and a covering comprising a curable rubber jacket over said tube and layer and additional, curable rubber layers over the peripheries of said flanges, the rubber in said assembly being cured to form an integral, bonded structure.

References Cited in the file of this patent

UNITED STATES PATENTS

| | | |
|---|---|---|
| 1,883,086 | Swartz | Oct. 18, 1932 |
| 2,461,594 | Flounders | Feb. 15, 1949 |
| 2,690,769 | Brown | Oct. 5, 1954 |
| 2,703,109 | Saville | Mar. 1, 1955 |